(12) United States Patent
Koike

(10) Patent No.: US 7,983,692 B2
(45) Date of Patent: Jul. 19, 2011

(54) WIRELESS COMMUNICATION APPARATUS AND DISTANCE MEASURING METHOD

(75) Inventor: Toru Koike, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 614 days.

(21) Appl. No.: 11/609,070

(22) Filed: Dec. 11, 2006

(65) Prior Publication Data

US 2007/0178837 A1 Aug. 2, 2007

(30) Foreign Application Priority Data

Dec. 21, 2005 (JP) .................... 2005-368683

(51) Int. Cl.
*H04W 24/00* (2009.01)

(52) U.S. Cl. ............ 455/456.1; 455/41.1; 455/41.2; 455/41.3; 342/21; 342/22; 342/28

(58) Field of Classification Search .......... 455/456.1, 455/41.1–41.3; 342/21–22, 28
See application file for complete search history.

(56) References Cited

U.S. PATENT DOCUMENTS

| | | | | |
|---|---|---|---|---|
| 6,295,019 | B1 * | 9/2001 | Richards et al. | 342/125 |
| 6,707,424 | B1 * | 3/2004 | Snyder et al. | 342/357.29 |
| 7,026,992 | B1 * | 4/2006 | Hunt et al. | 342/465 |
| 7,149,499 | B1 * | 12/2006 | Oran et al. | 455/404.2 |
| 7,203,500 | B2 * | 4/2007 | Leeper et al. | 455/456.1 |
| 7,289,813 | B2 * | 10/2007 | Karaoguz | 455/456.1 |
| 7,358,888 | B2 * | 4/2008 | Fullerton et al. | 342/57 |
| 7,577,444 | B2 * | 8/2009 | Bird et al. | 455/456.2 |
| 2002/0163901 | A1 * | 11/2002 | Spratt | 370/338 |
| 2005/0046608 | A1 * | 3/2005 | Schantz et al. | 342/127 |
| 2005/0113102 | A1 * | 5/2005 | Kwon et al. | 455/450 |
| 2005/0136845 | A1 * | 6/2005 | Masuoka et al. | 455/67.14 |
| 2006/0227740 | A1 * | 10/2006 | McLaughlin et al. | 370/329 |
| 2006/0251098 | A1 * | 11/2006 | Morioka | 370/432 |
| 2006/0291537 | A1 * | 12/2006 | Fullerton et al. | 375/145 |
| 2007/0002803 | A1 * | 1/2007 | Destino et al. | 370/335 |

FOREIGN PATENT DOCUMENTS

| | | | |
|---|---|---|---|
| JP | 2001-051049 | * | 2/2001 |
| JP | 2003-174368 | * | 6/2003 |
| JP | 2005-065072 | | 3/2005 |
| JP | 2005-065072 | * | 10/2005 |

OTHER PUBLICATIONS

MultiBand OFDM Physical Layer Proposal for IEEE 802.15 Task Group 3a by MultiBand OFDM Alliance SIG, Sep. 14, 2004.*

* cited by examiner

*Primary Examiner* — Jinsong Hu
*Assistant Examiner* — Qun Shen
(74) *Attorney, Agent, or Firm* — Cowan, Liebowitz & Latman, P.C.

(57) ABSTRACT

Proposed is a technique for implementing data communication and distance measurement even in a case where data communication and distance measurement share the physical layer. A wireless communication apparatus includes a radio unit and a distance measuring unit. The radio unit performs communication using a frame that includes at least a data period for transferring data and a beacon period for transmitting a beacon. The distance measuring unit utilizes the beacon period to measure the distance from the wireless communication apparatus to a target object whose distance is to be measured.

6 Claims, 11 Drawing Sheets

WIRELESS COMMUNICATION APPARATUS AND DISTANCE MEASURING METHOD

BACKGROUND OF THE INVENTION

1. Field of the Invention

The present invention relates to a technique for implementing data communication and distance measurement in a wireless communication apparatus.

2. Description of the Related Art

Ultra-wide band (UWB) has become the focus of attention in recent years. The radio signal used in UWB has a bandwidth of 500 MHz or greater, or a bandwidth that is 20% of the center frequency or greater. This makes possible the communication of large quantities of data at high speed.

It is also known that UWB makes it easy to implement a highly precise distance measurement function. The specification of Japanese Patent Application Laid-Open No. 2003-174368 discloses a method of finding the distance to an obstacle by measuring the time from transmission of a UWB pulse to return of the pulse reflected by the obstacle.

Further, the specification of Japanese Patent Application Laid-Open No. 2005-065072 proposes a method of measuring distance in UWB that employs an OFDM (Orthogonal Frequency Division Modulation) scheme.

The standardization of wireless USB has been proceeding in recent years. There is a high likelihood that wireless USB also will employ the above-mentioned UWB scheme in the physical layer. At present it appears that data communication with wireless USB will be performed using the MAS (Media Access Slot) that constructs a superframe. A beacon is inserted into a superframe every 65 ms.

In wireless USB, however, a concrete method for measuring distance has not been proposed.

SUMMARY OF THE INVENTION

Accordingly, the present invention proposes a technique for implementing data communication and distance measurement in ideal fashion even in a case where data communication and distance measurement share the physical layer.

The present invention is ideally applied to a wireless communication apparatus. A radio unit performs communication using a frame that includes at least a data period for transmitting data and a beacon period for transmitting a beacon, by way of example. Further, a distance measuring unit utilizes the beacon period to measure the distance from the wireless communication apparatus to a target object whose distance is to be measured.

Further features of the present invention will become apparent from the following description of exemplary embodiments with reference to the attached drawings.

DESCRIPTION OF THE EMBODIMENTS

Embodiments of the present invention will be illustrated below. The individual embodiments described below will be useful in understanding various concepts of the present invention, such as higher-, intermediate- and lower-order concepts of the invention. Further, the technical scope of the present invention is defined by the scope of the claims and is not limited by the individual embodiments set forth below.

First Embodiment

Figure 1:
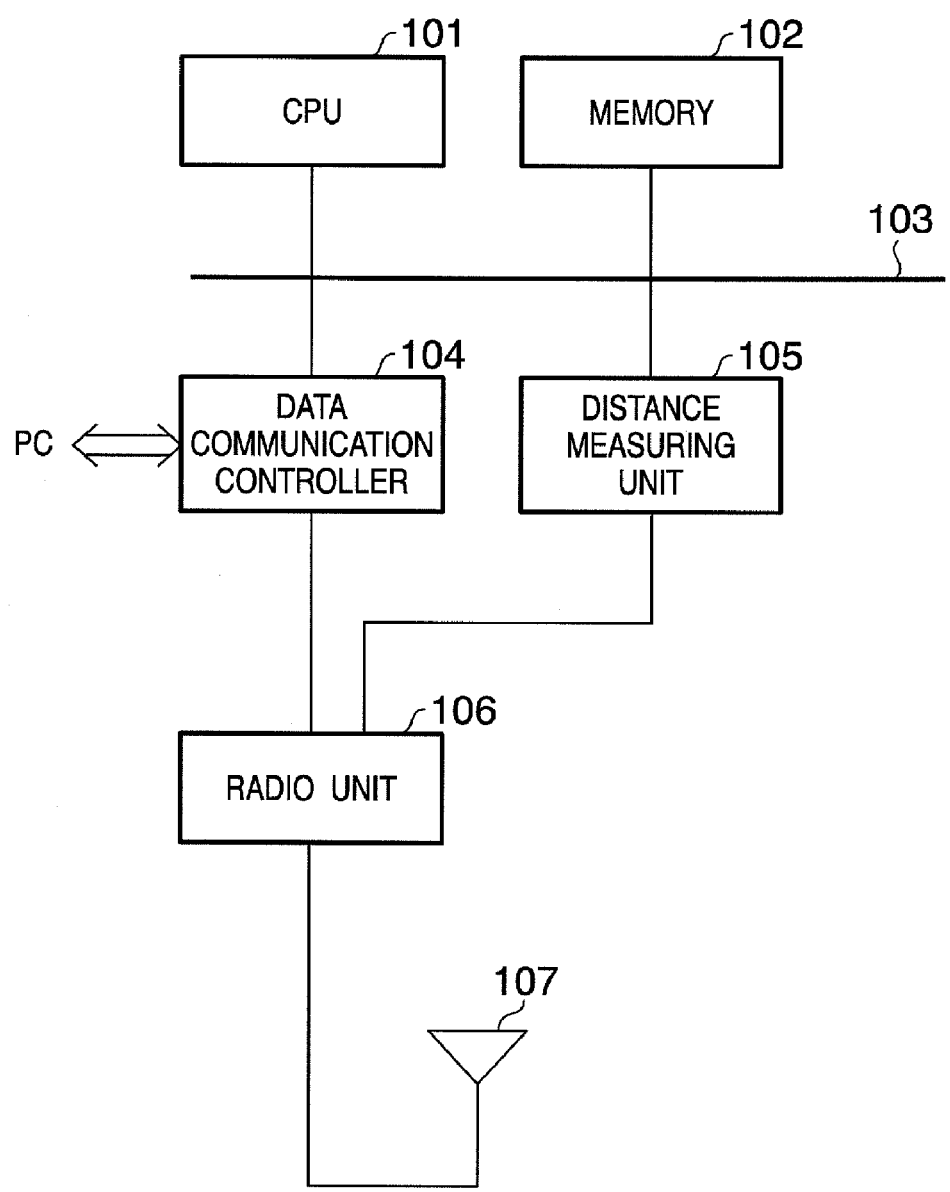
FIG. 1 is a block diagram illustrating an example of a wireless communication apparatus according to a first embodiment of the present invention.

FIG. 1 is a block diagram illustrating an example of a wireless communication apparatus according to a first embodiment of the present invention. The apparatus includes a CPU 101, which is a control unit for overall control of the components of the wireless communication apparatus; a memory 102, which is a storage unit for storing control program code and data; an internal bus 103, which is a bus by which the memory 102 and other units exchange data; and a data communication controller 104 mainly for controlling the communication of data relating to wireless USB. The data communication controller 104 is connected to a personal computer or to various small mobile devices to perform data communication. Of course, the same type of wireless communication apparatus is built in or connected to the personal computer, etc. That is, the data communication controller 104 relays data that is sent and received between this apparatus and another wireless communication apparatus via a radio unit 106.

The apparatus further includes a distance measuring unit 105 for executing distance measurement using the radio unit 106. The latter comprises a circuit relating to the physical layer (PHY). In this embodiment, the physical layer is shared by data communication and distance measurement. An antenna 107 is an aerial for receiving a radio signal.

There are a variety of schemes for implementing the radio unit 106. For example, an IR (Impulse Radio)-UWB scheme, a DS (Direct Sequence)-UWB scheme or an MB (Multi-Band)-OFDM-UWB scheme can be employed in the radio unit 106. The IR-UWB scheme is the simplest and involves using pulses of a very small pulse width [0<pulse width≦1 nanosecond (ns)] without relying upon a carrier wave. Pulses having a width of from several hundred picoseconds (ps) to 1 ns are currently under investigation.

The DS-UWB scheme and MB-OFDM-UWB scheme are of the multiband type. These divide the frequency band used in UWB into multiple bands and modulate a carrier by each band. Although the DS-UWB scheme employs direct sequence techniques, the MB-OFDM-UWB scheme uses OFDM and frequency mapping in combination.

Figure 2:
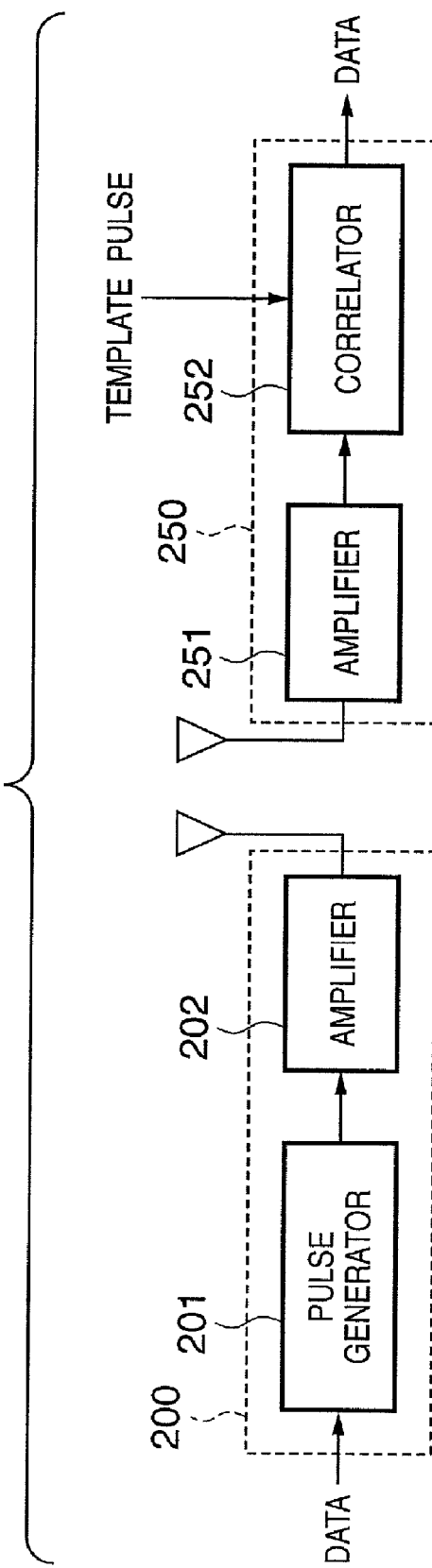
FIG. 2 is a diagram illustrating an example of a radio unit according to the first embodiment.

FIG. 2 is a diagram illustrating an example of the radio unit according to this embodiment. The radio unit 106 described will be one that uses the IR-UWB scheme. The radio unit 106 includes a transmitter 200 and a receiver 250. A pulse generator 201 in the transmitter 200 generates a pulse signal that corresponds to data input thereto, and an amplifier 202 in the transmitter 200 amplifies the pulse signal generated. In the receiver 250, on the other hand, an amplifier 251 amplifies a pulse signal that has been received, and a correlator 252 obtains a correlation value between the received pulse signal and a template pulse signal in order to extract data from the received pulse signal. Since the correlation value basically is "0" or "1", data is decided based upon the correlation value.

The CPU 201 instructs the distance measuring unit 105 to start distance measurement in the beacon period. The distance measuring unit 105 measures the time from transmission of a distance-measurement UWB pulse signal from the transmitter 200 to receipt of the signal by the receiver 250 owing to reflection by a target object whose distance is to be measured. The distance measuring unit 105 calculates the distance by multiplying this time by the propagation speed of the radio waves. Since this distance is the round-trip distance between the wireless communication apparatus and the target object, the round-trip distance is divided by 2 to thereby decide the one-way distance.

If the target object whose distance is to be measured is another wireless communication apparatus, the distance measuring unit 105 may measure the round-trip time of the signal by receiving a signal sent back by the other wireless communication apparatus. In a case where use is made of the signal sent back, there is a tendency for the precision of distance measurement to decline relatively in comparison with the case where use is made of the reflected signal.

In a case where a plurality of wireless communication apparatuses communicate simultaneously, the distance measuring unit 105 is also capable of measuring the distance to the wireless communication apparatus of the other party based upon a time shift from the simultaneous time to arrival of the beacon. However, if there is a shift in synchronization among the plurality of wireless communication apparatuses, this method of distance measurement will result in a decline in the accuracy of distance measurement. Accordingly, the method utilizing the reflected signal would be superior in relation to the accuracy of distance measurement. In general, the accuracy of distance measurement required differs depending upon the application that utilizes the information concerning measured distance. The method of distance measurement, therefore, may be decided taking the application into consideration.

Figure 3:
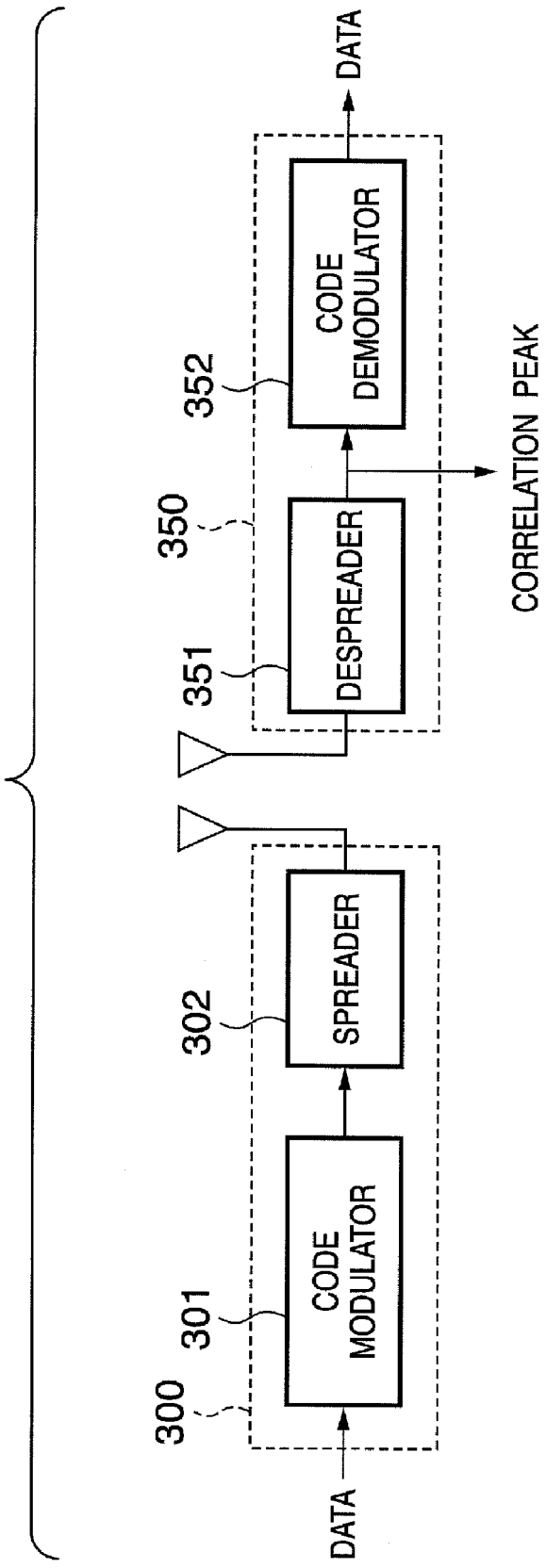
FIG. 3 is a diagram illustrating another example of a radio unit according to the first embodiment.

FIG. 3 is a diagram illustrating another example of a radio unit according to this embodiment. The radio unit 106 described will be one that uses the DS-UWB scheme. The radio unit 106 includes a transmitter 300 and a receiver 350. The transmitter 300 has a code modulator 301 for executing primary modulation such as phase modulation or amplitude modulation with regard to data input thereto, and a spreader 302 for subjecting the primary-modulated signal to spreading (secondary modulation). The receiver 350, on the other hand, has a despreader 351 for despreading the received signal. When despreading is performed, use is made of a spreading code identical with a spreading code used on the transmitting side. A correlation peak is obtained by a correlation operation applied to the spreading code. The distance measuring unit 105 performs distance measurement using the correlation peak. The receiver 350 further includes a code demodulator 352 for extracting data by demodulating the signal that has been despread.

Figure 4:
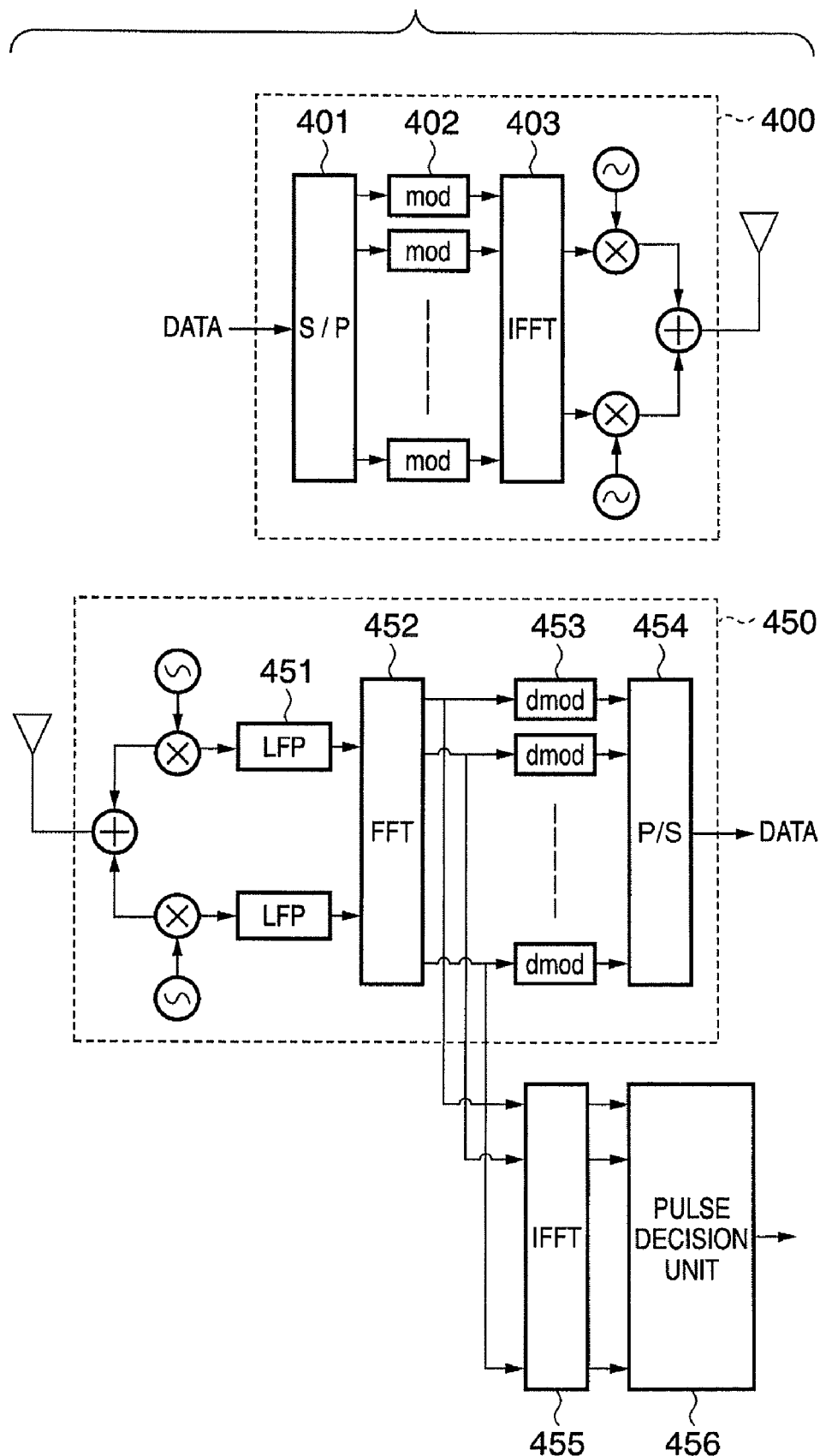
FIG. 4 is a diagram illustrating a further example of a radio unit according to the first embodiment.

FIG. 4 is a diagram illustrating a further example of a radio unit according to this embodiment. The radio unit described will be one that uses the OFDM-UWB scheme. Here a transmitter 400 includes a serial-to-parallel (S/P) converter 401 for converting input serial data to parallel data; a plurality of modulators (mod) 401 for subjected respective ones of the items of parallel data to code modulation; and an inverse Fourier transform (IFFT) unit 403 for transforming the code-modulated signal (a signal along the frequency axis) to a signal along the time axis. A receiver 450 includes a low-pass filter (LPF) 451 for extracting low-frequency components from the received signal; a Fourier transform unit 452 for subjecting the extracted signal to a Fourier transform to thereby convert the signal to a plurality of signal components on the frequency axis; a plurality of demodulators (dmod) 453 for demodulating respective ones of the signal components to thereby extract the respective items of data; and a parallel-to-serial (P/S) converter 454 for converting the parallel data to serial data.

With regard to distance measurement, an inverse Fourier transform unit 455 subjects the signal from the Fourier transform unit 452 to an inverse Fourier transform, thereby extracting a pulse train along the time axis. A pulse decision unit 456 decides the earliest arriving pulse from among the plurality of pulse trains and outputs only the pulse decided to the distance measuring unit 105. Accordingly, the distance measuring unit 105 is capable of measuring distance based upon the pulse that has arrived the earliest.

Figure 5:
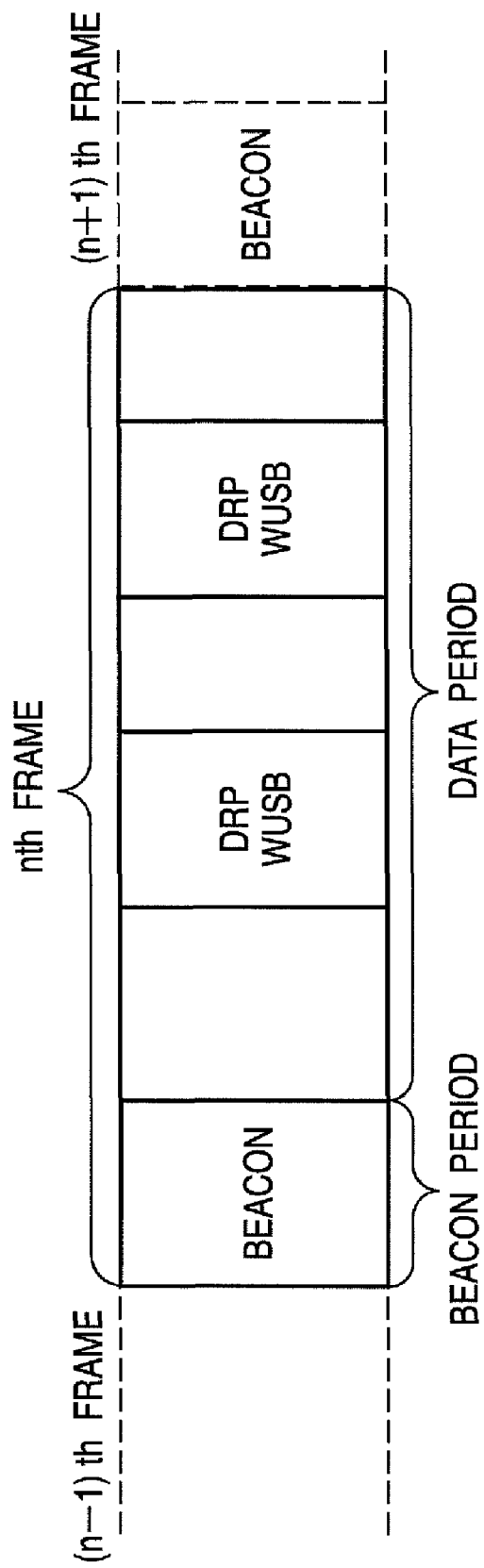
FIG. 5 is a diagram illustrating an example of the structure of a wireless USB frame according to the first embodiment.

FIG. 5 is a diagram illustrating an example of the structure of a wireless USB frame according to this embodiment. A beacon period is provided at the head of each frame. A data period is provided to follow the beacon period. It should be noted that an (n−1)th frame and an (n+1)th frame also have the same structure as the nth frame. Furthermore, the beacon period is provided periodically. That is, the radio unit 106 transmits the beacon periodically (e.g., every 65 ms). This means that the frame length is fixed (at 65 ms, by way of example). The frame is divided into 256 media access slots (MAS), by way of example. The beacon is used for synchronization and in order to reserve an MAS. A DRP (Distributed Reservation Protocol) WUSB provided in the data period is an MAS in which USB data is placed.

Figure 6:
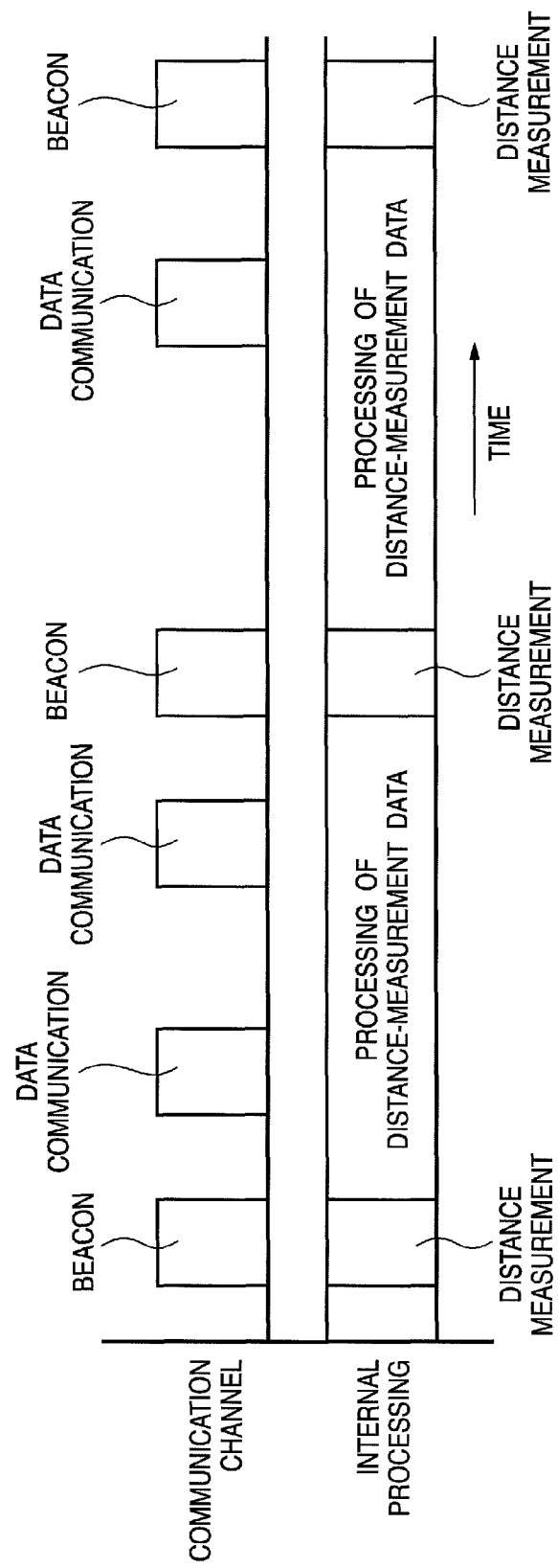
FIG. 6 is a diagram illustrating the temporal relationship between state of use of a communication channel and processing internally of the wireless communication apparatus according to the first embodiment.

FIG. 6 is a diagram illustrating the temporal relationship between state of use of a communication channel and processing internally of the wireless communication apparatus in this embodiment. As illustrated in FIG. 6, the distance measuring unit 105 may cause the radio unit 106 to execute transmission of the beacon and reception of the reflected beacon in the beacon period and may measure distance based upon the signal obtained from the radio unit 106 in the data period. For example, if distance measurement is performed in the nth frame, it will suffice if the distance measuring unit 105 terminates the distance decision by the time the next, i.e., (n+1)th, beacon is transmitted.

If distance measurement is thus completed within the period of one frame, then the distance measuring unit 105 can execute distance measurement frame by frame. That is, the radio unit 106 is capable of executing distance measurement periodically for the purpose of transmitting the beacon periodically.

Furthermore, the distance measuring unit 105 is capable of measuring the relative speed of the target object from the amount of temporal fluctuation in distance that has been determined based upon the periodically transmitted beacon.

For example, the distance measuring unit 105 can calculate traveling speed by dividing the difference between the distance detected in the nth frame and the distance detected in the (n+1)th frame by the frame period (e.g., 65 ms). It goes without saying that traveling speed corresponds to the relative speed between the wireless communication apparatus and the target object whose distance is to be measured.

Figure 7:
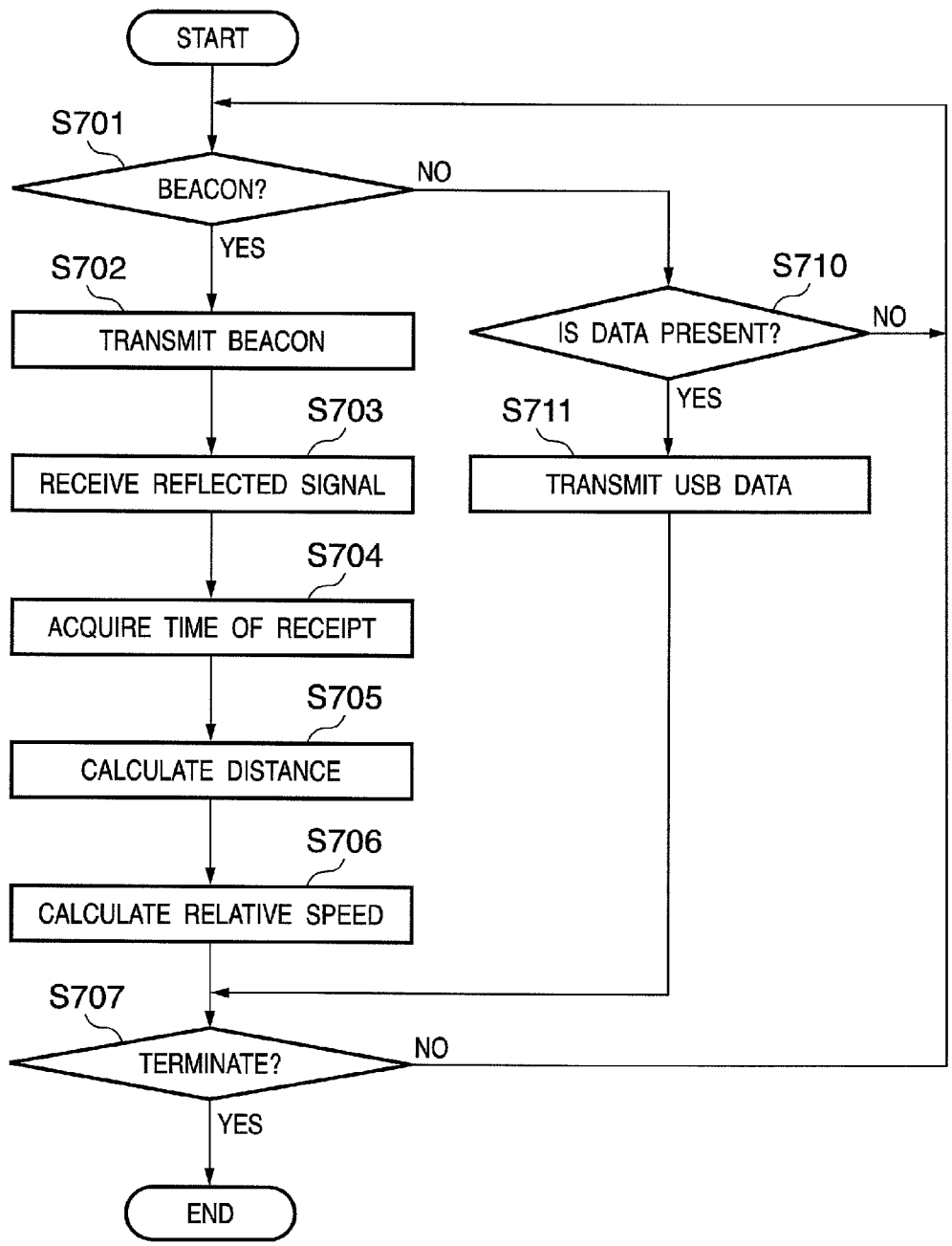
FIG. 7 is a flowchart illustrating an example of a distance measuring method according to the first embodiment.

FIG. 7 is a flowchart illustrating an example of a distance measuring method according to this embodiment. At step S701, the CPU 101 determines whether the present time is in the beacon period by a timer that measures the frame period. If the prevailing period is not the beacon period, the CPU 101 allows the data communication controller 104 to communicate data. Control then proceeds to step S710.

At step S710, the data communication controller 104 determines whether there is data that has been received from a personal computer or the like. If there is no such data, control returns to step S701. If there is such data, on the other hand, then control proceeds to step S711 and the data communication controller 104 outputs the data to the radio unit 106. The latter transmits this data using the MAS that has been reserved in the data period. Control then proceeds to step S707.

If it is determined at step S701 that the period is the beacon period, then control proceeds to step S702. Here the CPU 101 instructs the radio unit 106 to transmit the beacon. Further, the CPU 101 instructs the distance measuring unit 105 to start measuring distance.

Upon receiving the initially returned reflected signal, the radio unit 106 outputs a signal representing receipt of the signal to the distance measuring unit 105 at step S703.

When the signal representing receipt of the reflected signal enters, the distance measuring unit 105 acquires the time information prevailing at this time from the timer at step S704. For example, if the timer is reset when the beacon is transmitted, a count value indicated by the timer when the reflected signal is received corresponds to the time information to be obtained. In actuality, this time information agrees with the time it takes for the UWB pulse signal to make a round trip from the wireless communication apparatus to the target object and back.

At step S705, the distance measuring unit 105 calculates the distance from the radio base station to the target object based upon the acquired time information. The information concerning the distance calculated by the distance measuring unit 105 may be stored in the memory 102 by the CPU 101.

At step S706, the distance measuring unit 105 or CPU 101 calculates the relative speed between the wireless communication apparatus and the target object from the difference between the distance measured in the preceding frame and the distance measured currently. It should be noted that step S706 is optional.

At step S707, the CPU 101 determines whether communication is to be terminated. Control returns to step S701 only in a case where communication is continued.

Thus, as described above, the present invention is applied ideally to a wireless communication apparatus that communicates using a frame that includes at least a data period for transmitting data and a beacon period for transmitting a beacon, by way of example. In accordance with the first embodiment, the wireless communication apparatus is provided with the radio unit 106 for transmitting and receiving a UWB radio signal having a bandwidth of 500 MHz or greater, or a bandwidth that is 20% of the center frequency or greater. In particular, the distance measuring unit 105 measures the distance from the wireless communication apparatus to the target object utilizing the beacon period. As a result, distance measurement can be achieved without hindering the transfer of data executed in the data period.

For example, the distance measuring unit 105 is capable of implementing distance measurement by measuring the time from transmission of the beacon from the radio unit 106 to receipt of the beacon by the radio unit 106 owing to reflection by the target object. Since the UWB radio signal is capable of using a very narrow pulse width, distance measurement can be achieved with a precision much higher than heretofore possible.

The distance measuring unit 105 calculates distance based upon the beacon, which has been reflected back from the target object, while the radio unit 106 transfers data in the data period. This is advantageous in that distance measurement can be performed frame by frame. Further, it is possible for a single physical layer to be shared by data transfer and distance measurement.

The radio unit 106 transmits a pulse signal having a pulse width greater than zero and less than 1 nanosecond as at least part of the beacon. Thus employing a very narrow pulse width provides a marked improvement in the accuracy of distance measurement.

The distance measuring unit 105 is also capable of measuring the relative speed of the target object from the amount of temporal fluctuation in distance that has been decided based upon the periodically transmitted beacon. If use is made of the fact that the beacon is transmitted every 65 ms in USB, an advantage obtained is that relative speed can be decided in simple fashion from distance acquired every 65 ms.

It should be noted that the structure of the radio unit 106 may employ other schemes and not just the IR-UWB, DS-UWB and MB-OFDM-UWB schemes. For example, the distance measuring unit 105 may decide the distance to another wireless communication apparatus, which is the target object whose distance is to be measured, based upon the time response characteristic of the beacon transmitted from the other wireless communication apparatus. More specifically, the distance measuring unit 105 can acquire the time response characteristic by applying an inverse Fourier transform to a frequency response characteristic obtained by applying a Fourier transform to an OFDM-type beacon transmitted form the other wireless communication apparatus. Further, the distance measuring unit 105 may acquire the time response characteristic by despreading a direct-sequence-type beacon transmitted from the other wireless communication apparatus.

Regardless of which UWB scheme is employed, the present invention is capable of measuring distance utilizing a beacon transmitted in the beacon time period and, hence, there is no impediment to data transfer. That is, according to the present invention, a single physical layer can be shared by a data transfer function and distance measurement function.

Second Embodiment

Figure 8:
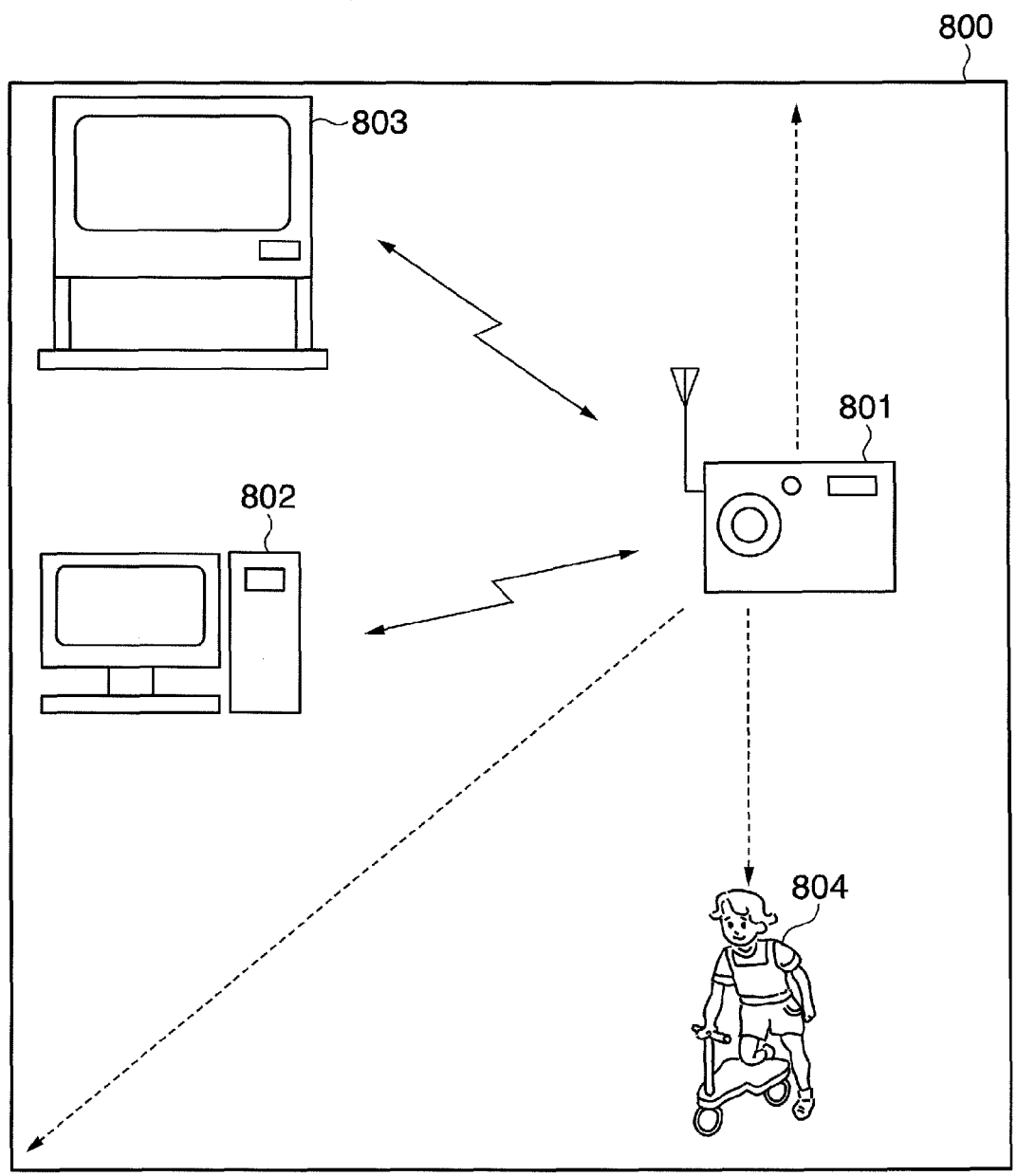
FIG. 8 is a diagram for describing the configuration of a system according to a second embodiment of the present invention.

FIG. 8 is a diagram for describing the configuration of a system according to a second embodiment of the present invention. According to this embodiment, it is assumed that a digital camera 801 is used in a room enclosed by a wall 800. Of course, the communication section of the digital camera 801 employs the wireless communication apparatus described in the first embodiment. It is assumed that the nature of the wall 800 is such that the wall reflects the radio waves utilized by the wireless communication apparatus that operates in compliance with the wireless USB standard.

The digital camera 801 is capable of transferring image data to a personal computer (PC hereinafter) 802 or digital television 803 by utilizing this wireless communication apparatus. It is assumed that PC 802 and digital television 803 also employ the above-described wireless communication apparatus. A subject 804 is to have its picture taken using the digital camera 801.

<Structure of Digital Camera>

Figure 9:
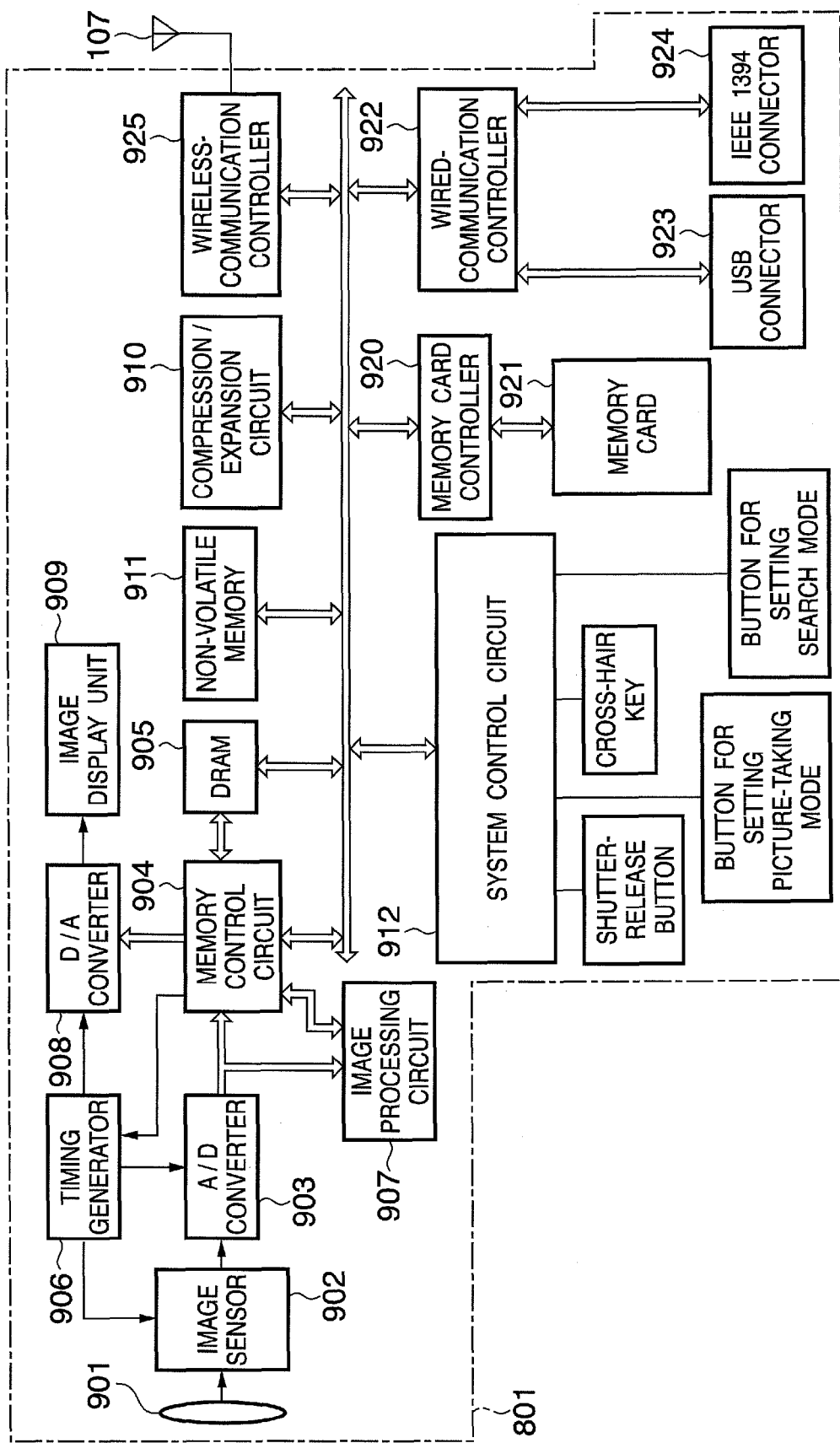
FIG. 9 is a block diagram illustrating the internal structure of a digital camera according to the second embodiment.

FIG. 9 is a block diagram illustrating the internal structure of the digital camera according to this embodiment. The digital camera 801 is a so-called image sensing device and may be a still camera or a video movie camera.

A picture-taking lens 901 forms the optical image of the subject on an image sensor 902. The latter converts the optical image to an analog signal. An A/D converter 903 converts the analog signal, which is output from the image sensor 902, to a digital signal (image data). An image processing circuit 907 subjects the image data to image processing. A DRAM 905 stores the shot image data, etc., temporarily and is used as a working memory in various processing. A non-volatile memory 911 stores image data, etc. A memory control circuit 904 controls the input and output of image data to and from the DRAM 905 or non-volatile memory 911.

A D/A converter 908 converts the image data, which has been stored in the DRAM 905 or non-volatile memory 911, to an analog signal. An image display unit 909 displays the image represented by the image data. A timing generating circuit 906 supplies a clock signal and control signal to the image sensor 902, A/D converter 903 and D/A converter 908.

A compression/expansion circuit 910 compresses or expands the image data. A system control circuit 912 exercises overall control of each of the units in the digital camera 801. A memory card controller 920 controls the input and output of image data to and from a memory card 921.

A wired-communication controller 922 controls communication with an external device connected via a USB connector 923 or IEEE 1394 connector 924. The wired-communication controller 922 is provided internally with a USB controller (not shown) connected to the USB connector 923 and with an IEEE 1394 controller (not shown) connected to the IEEE 1394 connector 924.

A wireless-communication controller 925 corresponds to the wireless communication apparatus described in the first embodiment. That is, the wireless-communication controller 925 is equipped with the above-described data transfer function and distance measurement function. The wired-communication controller 922 and wireless-communication controller 925 may be constructed as a single integrated unit.

<Communication Power Control>

Communication power control utilizing the results of distance measurement will be described next. In order to perform wireless communication in ideal fashion according to the example shown in FIG. 8, it will suffice if the digital camera 801 in the room is capable of communicating with another party present at the position farthest away. In FIG. 8, the position farthest away is the lower left-hand corner. The lower left-hand corner is nothing more than a simple example. If a signal is transmitted with excessive power, not only is power consumed wastefully but there is also the danger that communication performed by other devices will be impaired owing to leakage of radio waves to the exterior of the room.

In this embodiment, the position farthest from the digital camera 801 in the room is specified by distance measurement and transmission power is controlled in accordance with the distance to the specified position. It is assumed that the effects of multipath and shadowing are negligible.

Figure 10:
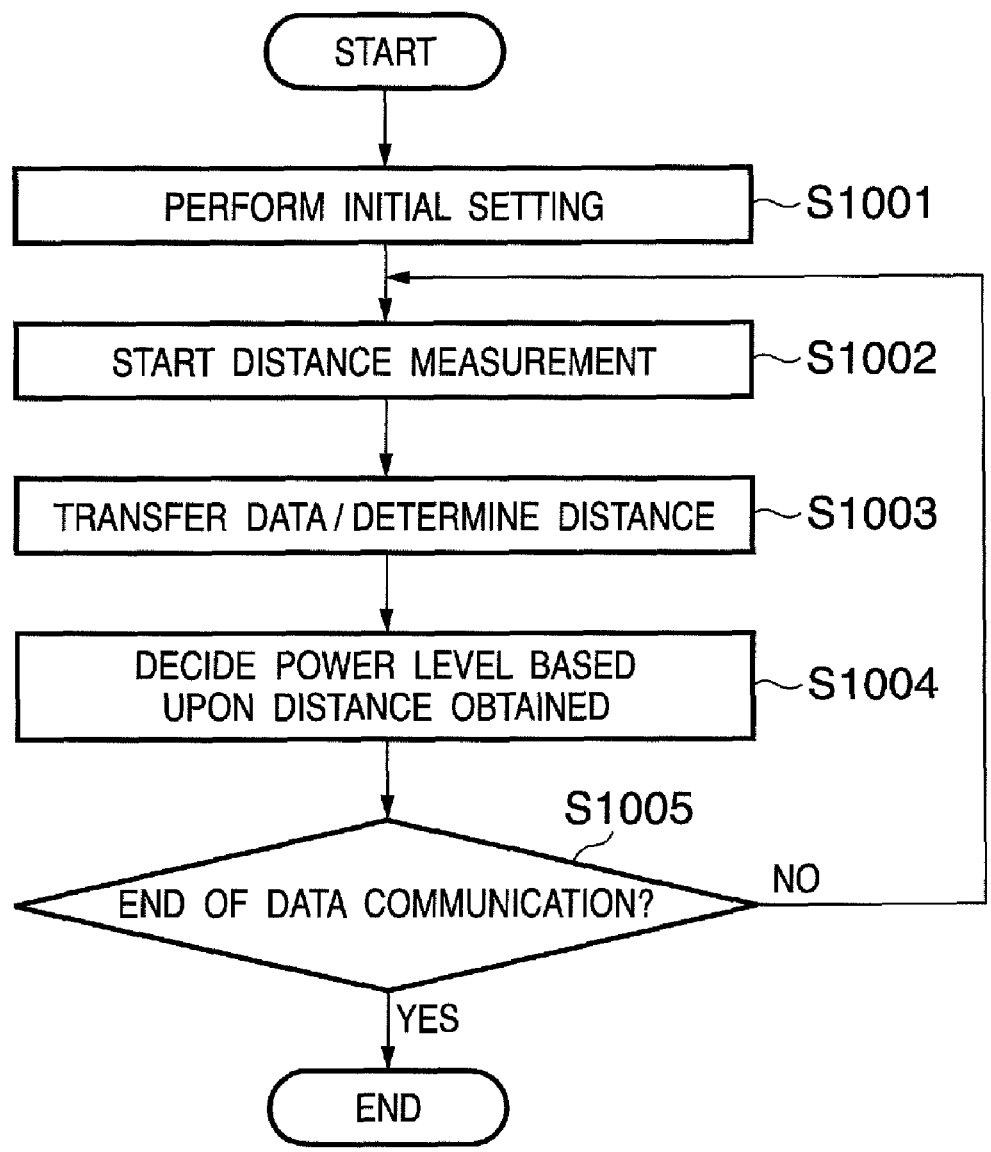
FIG. 10 is a flowchart illustrating an example of a method of controlling communication power in ideal fashion according to the second embodiment.

FIG. 10 is a flowchart illustrating an example of a method of controlling communication power in ideal fashion according to this embodiment. If the wireless communication mode is set by the user, the system control circuit 912 reads an initial value of transmission power from the non-volatile memory 911 and sets this initial value in the wireless-communication controller 925 at step S1001. The CPU 101 of the wireless-communication controller 925 transmits the signal from the radio unit 106 in accordance with the transmission power that has been set. Here communication means the transfer of a shot image in the digital television 803.

The CPU 101 starts distance measurement utilizing the beacon period at step S1002. Next, at step S1003, the CPU 101 of the wireless-communication controller 925 executes distance calculation processing in parallel with execution of data transfer in the data period. It should be noted that the method of determining distance may employ a method other than calculation. The reason is that the method of distance calculation does not impose a limitation upon the present invention.

At step S1004, the CPU 101 decides the level of transmission power in accordance with the distance information obtained by distance measurement. For example, the CPU 101 decides the level of transmission power using as a reference the longest distance among the plurality of distances acquired. It should be noted that a table in which the corresponding relationship between distance and transmission power level has been registered may be stored in the non-volatile memory 911 in advance. The system control circuit 912 may store each of the items of distance information acquired from the CPU 101 in the DRAM 905 as time-series distance information. The system control circuit 912 may store the distance information and time at which the distance information was acquired as a pair in the DRAM 905. The distance information and information representing the time of acquisition thereof may be put into the form of a table.

At step S1005, the CPU 101 determines whether data communication has ended. If data communication has not ended, control returns to step S1002. If data communication has ended, on the other hand, then the processing of this flowchart is exited.

In accordance with this embodiment, transmission power control for performing ideal wireless communication in the room surrounded by wall 800 can be executed in real time in parallel with data communication. This is advantageous in that not only can power consumption be suppressed but it is also possible to reduce interference outside the room.

By way of example, the above-described processing is effective also in a case where the digital camera 801 is brought near the subject 804 while performing a data transfer with the digital television 803. That is, the position farthest from the digital camera 801 changes as the camera approaches the subject 804. For example, there are instances where the upper right-hand corner of the room in which the digital television 803 has been installed is the position farthest away. Accordingly, even if the digital camera 801 moves, the wireless-communication controller 925 is capable of controlling transmission power in ideal fashion in real time.

Third Embodiment

A third embodiment will be described with regard to a case where the digital camera 801 transfers a shot image to PC 802 while continuously taking a picture of the subject 804.

In general, the system control circuit 912 is capable of transferring shot image data and its ancillary information as a file in the Exif format when a data transfer is performed. The Exif format is merely an illustration. Accordingly, the ancillary information can contain information indicating the distance from the digital camera 801 to the subject 804.

Generally, distance information that has been acquired by autofocus or by an infrared sensor is utilized as ancillary information. Here, however, it is assumed that use is made of the distance information described in the first or second embodiment.

Figure 11:
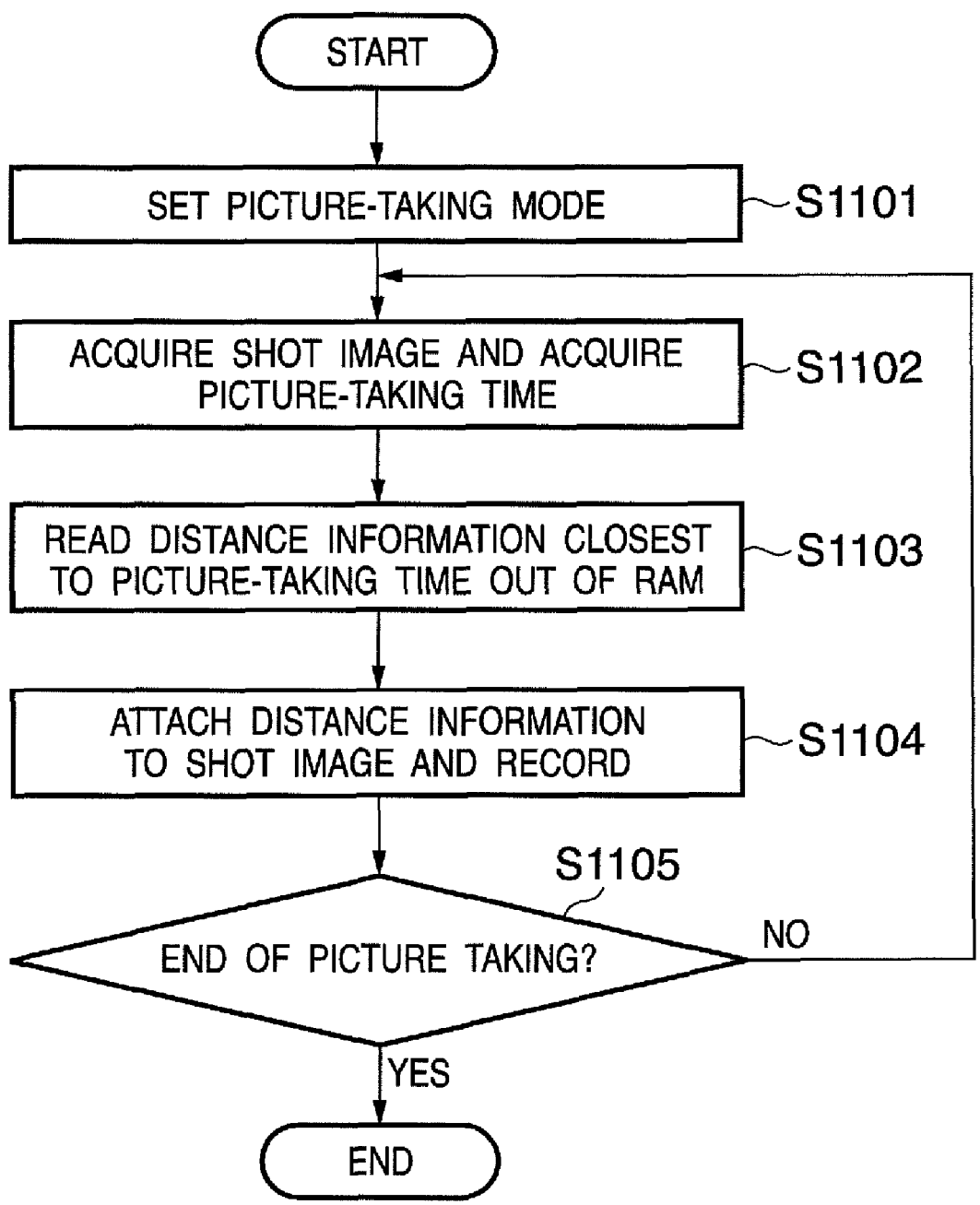
FIG. 11 is a flowchart illustrating an example of image sensing processing according to a third embodiment of the present invention.

FIG. 11 is a flowchart illustrating an example of image sensing processing according to this embodiment. Here it is assumed that picture-taking processing and acquisition of distance information described in the first embodiment are executed in parallel. However, it is assumed that the distance information acquired is information indicating the distance from the digital camera 801 to the subject 804. In order to acquire information indicating the distance to the subject 804, it is desired that the directivity of the antenna 107 be such that the antenna points in the direction of the subject 804. In actuality, the shortest distance among the acquired distances would be the distance to the subject. The reason for this is that usually there is no obstacle between the digital camera 801 and the subject 804.

At step S1101 in FIG. 11, the system control circuit 912 sets the picture-taking mode to the continuous picture-taking mode. Then, at step S1102, in response to pressing of a shutter-release button, pictures are taken of the subject continuously and the time at which the pictures are taken is acquired from a timer or the like.

Next, at step S1103, from among distance-information acquisition times that are being held in the DRAM 905, the system control circuit 912 specifies the acquisition time that is nearest to the picture-taking time and reads the distance information corresponding to this specified time out of the DRAM 905.

At step S1104, the system control circuit 912 appends the read distance information as ancillary information of the shot image and stores the results on the memory card 921. The shot image data and the ancillary information are transferred to PC 802, etc., by the wireless-communication controller 925 (S711). The system control-circuit 912 repeats the above-described processing until continuous picture taking ends (S1105).

In accordance with this embodiment, as described above, distance information described in the first embodiment, etc., can be utilized as Exif-format ancillary information. That is, in this embodiment, while shot image data is being acquired and transferred, distance information can also be acquired and transferred together.

Accordingly, it is possible to acquire and transfer accurate distance information even in a case where the distance between a digital camera and subject fluctuates in real time, as in a case where the subject is moving continuously.

Although this embodiment has been described mainly with regard to transfer of a still image, it goes without saying that the present invention is applicable to the shooting and transfer of moving images. For example, it is possible to attach and transfer distance information frame by frame for every frame that constitutes a moving image.

Other Embodiments

Although various embodiments have been described above in detail, the present invention may be applied to a system comprising a plurality of devices or to an apparatus comprising a single device. For example, the invention is applicable to an image sensing device, scanner, printer, personal computer, copier, multifunction peripheral and facsimile machine, etc.

Furthermore, the object of the invention is attained also by supplying a software program, which implements the functions of the foregoing embodiments, directly or remotely to a system or apparatus, reading the supplied program codes with a computer of the system or apparatus and executing the program codes.

Accordingly, since the functions and processing of the present invention are implemented by computer, the program codes per se installed in the computer also implement the present invention. In other words, a computer program that is for the purpose of implementing the above-described functions and processing it itself one aspect of the invention.

In this case, so long as the system or apparatus has the functions of the program, the form of the program, e.g., object code, a program executed by an interpreter or script data supplied to an operating system, etc., does not matter.

Examples of recording media for supplying the program are a flexible disk, hard disk, optical disk, magneto-optical disk, CD-ROM, CD-R and CD-RW. Further examples of recording media are magnetic tape, non-volatile type memory card, ROM, DVD (DVD-ROM, DVD-R), etc.

The program may be downloaded from a website on the Internet using a browser possessed by a client computer. That is, the computer program per se of the present invention or an automatically installable compressed file may be downloaded from the website to a recording medium such as a hard disk. Further, the program of the present invention can be supplied by dividing the program code constituting the program into a plurality of files and downloading the files from different websites. In other words, there are cases where a WWW server that downloads, to multiple users, the program files that implement the functions and processes of the present invention by computer also is covered by the present invention.

Further, the program of the present invention may be encrypted, stored on a storage medium such as a CD-ROM and distributed to users. In this case, only users who meet certain requirements are allowed to download decryption key information from a website via the Internet. The encrypted program may be run upon decrypting it using the key information, thereby installing the program in the computer.

Further, the functions of the embodiments are implemented by having a computer execute a program that has been read. In addition, an operating system or the like running on the computer may perform all or a part of the actual processing based upon the indications in the program. The functions of the embodiments can be implemented in this case as well.

Furthermore, a program that has been read from a recording medium may be written to a memory provided on a function expansion board inserted into the computer or provided in a function expansion unit connected to the computer. A CPU or the like provided on the function expansion board or function expansion unit may perform some or all of the actual processing based upon the indications in the program. The functions of the foregoing embodiments may be implemented in this fashion as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-368683, filed on Dec. 21, 2005, which is hereby incorporated by reference herein in its entirety.

What is claimed is:

1. A wireless communication apparatus comprising:

a radio unit which performs communication using a frame that includes at least a data period for transferring data and a beacon period for transmitting a beacon; and a distance measuring unit which measures the distance from said wireless communication apparatus to a target object whose distance is to be measured, by transmitting a measuring signal to the target object, wherein said distance measuring unit determines the distance from said wireless communication apparatus to the target object by measuring time from transmission of the beacon as the measuring signal from said radio unit to receipt of the beacon by said radio unit owing to reflection by the target object, and wherein said distance measuring unit transmits the measuring signal during the beacon period and does not transmit the measuring signal during the data period, and said distance measuring unit calculates distance that is based upon the beacon that has been reflected from the target object;

wherein said distance measuring unit determines the distance to another wireless communication apparatus, which is a target object whose distance is to be measured, based upon time response behavior of the beacon as the measuring signal transmitted from the other wireless communication apparatus; and wherein said distance measuring unit acquires the time response behavior by applying an inverse Fourier transform to a frequency response characteristic obtained by applying a Fourier transform to an OFDM-scheme beacon transmitted from the other wireless communication apparatus.

2. The apparatus according to claim 1, wherein said radio unit transmits a pulse signal as the measuring signal having a pulse width greater than zero and less than 1 nanosecond as at least part of the beacon.

3. The apparatus according to claim 1, wherein said distance measuring unit acquires the time response behavior by despreading a direct-sequence-scheme beacon transmitted from the other wireless communication apparatus.

4. The apparatus according to claim 1, further comprising a speed measuring unit which measures relative speed of the target object from amount of temporal fluctuation in distance that has been determined based upon the beacon as the measuring signal, which is transmitted periodically.

5. The apparatus according to claim 1, further comprising a transmission power controller which controls transmission power of a radio signal, which is transmitted from said radio unit, in accordance with distance acquired in a room within which said wireless communication apparatus is situated.

6. The apparatus according to claim 1, said radio unit transmits and receives a radio signal having a bandwidth of 500 MHz or greater, or a bandwidth that is 20% of the center frequency or greater.

* * * * *